United States Patent
Eberhardt

[11] Patent Number: 6,038,749
[45] Date of Patent: Mar. 21, 2000

[54] HOOK AND LOOP COMBINED SHOWER CURTAIN AND LINER CONSTRUCTION

[76] Inventor: Stephanie A. Eberhardt, 183 Roundabout Trail, Camden, Del. 19934

[21] Appl. No.: 09/265,411

[22] Filed: Mar. 10, 1999

Related U.S. Application Data

[63] Continuation-in-part of application No. 09/041,389, Mar. 12, 1998, Pat. No. 5,894,642.

[51] Int. Cl.[7] ........................................... A44B 1/04
[52] U.S. Cl. .............................. 24/306; 24/716; 24/598.2; 24/442; 160/368.1; 16/87.2
[58] Field of Search .............................. 24/716, 306, 442, 24/706.1, 598.2; 16/87.2; 160/330, 368.1

[56] References Cited

U.S. PATENT DOCUMENTS

| | | | |
|---|---|---|---|
| 2,007,580 | 7/1935 | Menge | 24/716 |
| 4,972,896 | 11/1990 | Roberts | 160/368.1 |
| 5,090,095 | 2/1992 | Lightfoot | 24/716 |
| 5,109,912 | 5/1992 | Gary . | |
| 5,148,580 | 9/1992 | Dyckow . | |
| 5,170,974 | 12/1992 | Ruggiero | 24/716 |
| 5,228,149 | 7/1993 | Phinn, Jr. . | |
| 5,291,632 | 3/1994 | Akashi | 16/87.2 |
| 5,421,393 | 6/1995 | Wolfe . | |
| 5,495,628 | 3/1996 | Logan . | |
| 5,544,387 | 8/1996 | Yamamoto et al. | 24/306 |
| 5,586,595 | 12/1996 | Takizawa et al. . | |
| 5,615,461 | 4/1997 | Tominaga et al. . | |
| 5,651,407 | 7/1997 | Perez . | |

FOREIGN PATENT DOCUMENTS 1162201  8/1969  United Kingdom .

Primary Examiner—Victor N. Sakran
Attorney, Agent, or Firm—Richard C. Litman

[57] ABSTRACT

A combined shower curtain and liner construction held together by hook and loop strips, wherein the liner sheet is attached below the hook apertures of the shower curtain sheet.

5 Claims, 2 Drawing Sheets

HOOK AND LOOP COMBINED SHOWER CURTAIN AND LINER CONSTRUCTION

CROSS REFERENCE TO RELATED APPLICATION

This is a continuation-in-part of application Ser. No. 09/041,389 filed Mar. 12, 1998 U.S. Pat. No. 5,894,642.

BACKGROUND OF THE INVENTION

1. Field of the Invention

The present invention relates generally to a curtain construction for a shower compartment or shower and tub combination. More specifically, a shower curtain and shower liner are secured together with hook and loop material.

2. Description of the Related Art

Ornamented or colorful shower curtains hanging from a rod by hooks are in some instances protected in the rear by a separate shower curtain liner to prevent the shower curtain from excessive accumulation of dirt and soap solutions on the rear surface of the shower curtain. Cleaning of the liner requires removal from the shower hooks which necessitates the reaching up and sometimes tearing the holes in the plastic liner for the hooks in the process.

This problem is eliminated entirely by the present invention, by attaching the liner without apertures to the apertured shower curtain by hook and loop material. The removal can consist of either the entire combination of curtain and liner from the hooks or just the liner from the shower curtain without excessive strain on the shower curtain holes held by the hooks.

The relative art of interest describes various means for attaching the shower curtains to a shower stall, but none describe the present ergonomic combination of a liner attached to the hanging shower curtain by hook and loop material.

The relevant art will be discussed in the order of perceived relevance to the present invention.

U.K. Patent Application No. 1,162,201 published on Aug. 20, 1969, for Joseph R. Wylde describes hook and loop means for attaching a curtain to a rail. An I-beam serves as a holder for a plastic U-shaped runner which may have rollers. An inch square woven fabric pieces with selvedges at its ends have an aperture at one end for hanging from a runner and a hook material on one side for attachment to the loop material configured as one or more strips or a plurality of squares secured to a curtain along with or on pleating strips. The modified curtains and rail may be used for hospitals where decoration of the curtain is unimportant. The hanging system of the publication is distinguished by its required one inch squares for attaching one curtain by hook and loop material. No liner sheet was suggested.

U.S. Pat. No. 5,109,912 issued on May 5, 1992, to Leonard Gary describes a drapery system employing a standard C-shaped drapery rack housing which holds a drapery carrier having a spool-shaped head portion supporting a flat plate portion having hook material on one side and loop material on the other side. These fastening aids will attach to hook or loop patches on the top rear edge of the drapery. The drapery may have pockets for inserting the drapery carriers. The drapery system is distinguishable for its reliance on separate drapery carriers of a specific configuration.

U.S. Pat. No. 5,495,628 issued on Mar. 5, 1996, to Kim Logan describes a shower curtain having a selectively raisable lower portion by utilizing several horizontal rows of hook or loop patches on a shower curtain and a shower curtain liner. The curtains are suspended from a horizontal rod by ring fasteners. The shower curtains are distinguishable for placing the hook and loop patches at different locations for a different purpose.

U.S. Pat. No. 5,615,461 issued on Apr. 1, 1997, to Yutaka Tominaga et al. describes a hanging device for a pleated curtain having separated patches of female or looped fasteners on its top rear edge which mate with a plurality of curtain hanging fasteners. A fastener comprises a rectangular plate-like base member with a top hook. The base member has a critical arrangement on one face of male or hook fasteners which are molded with the plastic base. The hooks are formed in three groups with the hooks directed either downward or outward to resist disengagement. The hanging device is hooked onto a curtain runner with rollers traversing a C-section curtain rail. The hanging device is distinguishable based on its critical arrangement of hooks on the base member and the requirement for looped material pieces on the curtain.

U.S. Pat. No. 5,586,595 issued on Dec. 24, 1996, to Toshiaki Takizawa et al. describes a curtain attachment connector comprising a fastener member similar to that of Tominaga et al. except for the arrangement of the hook elements arranged in rows, columns or in a scattered array with the hook ends up. This curtain attachment connector is distinguishable for its requirement of only hooks on the fastener member.

U.S. Pat. No. 5,228,149 issued on Jul. 20, 1993, to Alex J. Phinn, Jr. describes a fastening means and method for a shower curtain employing hook and loop material for fastening only the side edge of the curtain to the wall of the shower stall. A disposable rule is supplied for positioning of the patches of fastening material to the wall which are spaced closer than the patches on the shower curtain to obtain a tensioning effect. The fastening system is distinguished by its use for attaching a side of a shower curtain to a shower stall wall, and the absence of a suggestion for attaching shower liners as well.

U.S. Pat. No. 5,148,580 issued on Sep. 22, 1992, to Dean W. Dyckow describes a shower curtain sealing and fastening arrangement kit. A strip of hook or loop material is attached to one side edge of a shower curtain to mate with another strip of loop or hook material on the shower stall wall. A sealing protrusion strip is also provided to apparently clamp the edge of the shower curtain. This arrangement is distinguishable for attaching only a side of the shower curtain to the wall, and the absence of a suggestion for attaching shower liners.

U.S. Pat. No. 5,651,407 issued on Jul. 29, 1997, to Hilda M. Perez describes looped shower curtain fasteners utilizing hook and loop fastening dots to attach to the top edge of a shower curtain. The loops are strengthened with a plastic strip and can be decorative with eyelet fasteners for artificial flowers. The fasteners are distinguished by the critical use of loops.

U.S. Pat. No. 5,421,393 issued on Jun. 6, 1995, to Michael Wolfe describes a shower curtain edge stay by utilizing stiffened horizontal rib members disposed in the shower curtain adjacent to a lower vertical side edge and hook and loop tabs on the lower side edge to attach to a wall. Curtain magnets on the lower edge of the shower curtain are also employed to prevent inward curling. The curtain edge stay is distinguishable by its use of hook and loop material only on a lower edge of the shower curtain.

None of the above inventions and patents, taken either singularly or in combination, is seen to describe the instant invention as claimed. Thus, a hook and loop combined shower curtain and liner construction solving the aforementioned problems is desired.

SUMMARY OF THE INVENTION

Accordingly, it is a principal object of the invention to provide a combined shower curtain and liner construction.

It is another object of the invention to provide a hook and loop combined shower curtain and liner construction.

It is a further object of the invention to provide a hook and loop combined shower curtain and liner construction, wherein the components are removably joined in their top regions.

Still another object of the invention is to attach the liner to the shower curtain below the apertures in the shower curtain.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
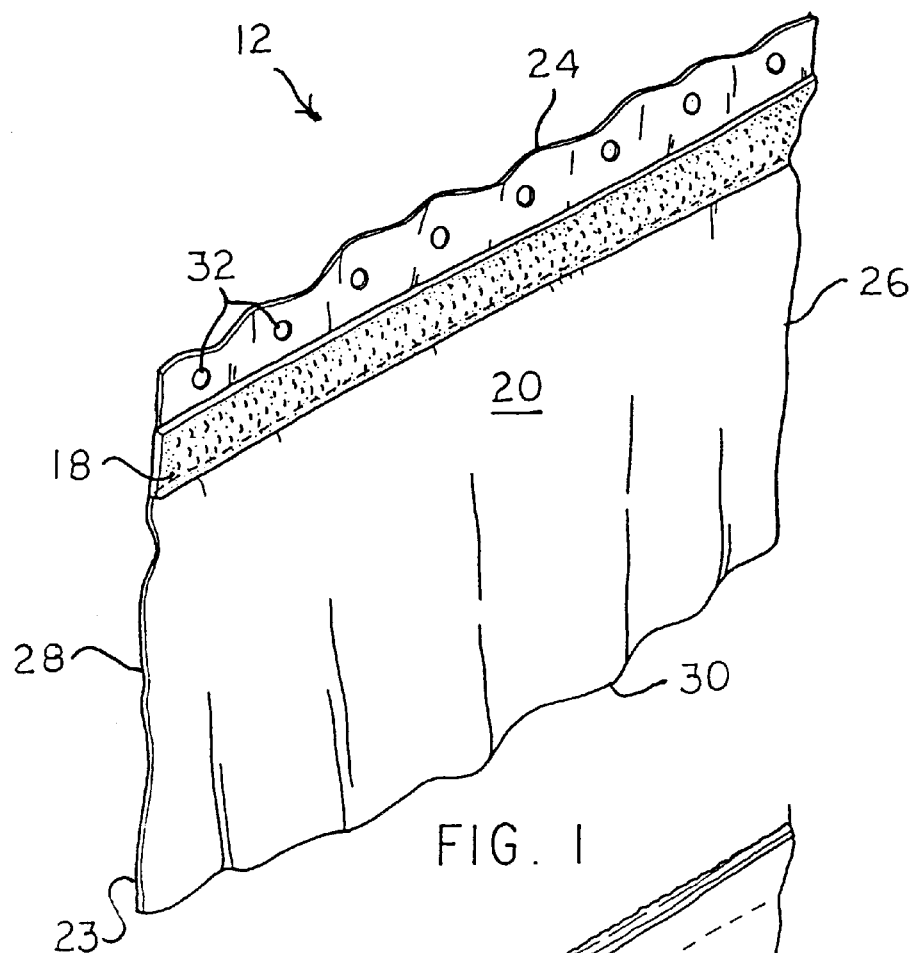
FIG. 1 is a perspective rear view of a partial shower curtain sheet with the loop fastener strip attached according to the present invention.
Figure 2:
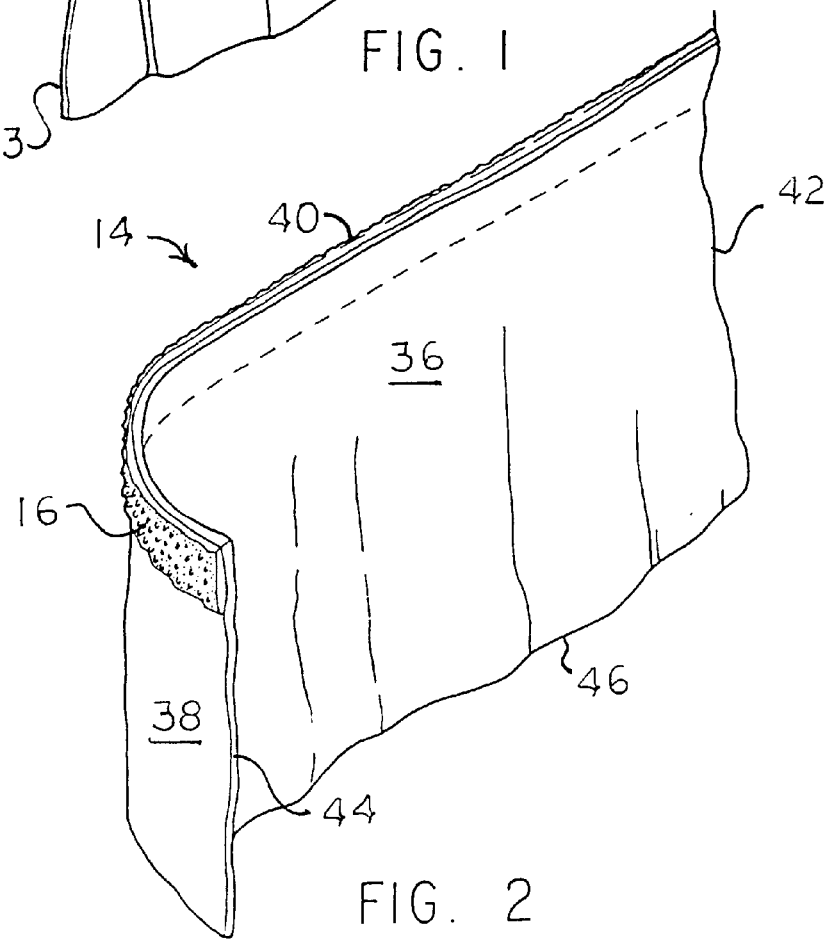
FIG. 2 is a perspective rear view of a partial liner sheet with one edge rolled back to show the hook fastener strip according to the present invention.
Figure 3:
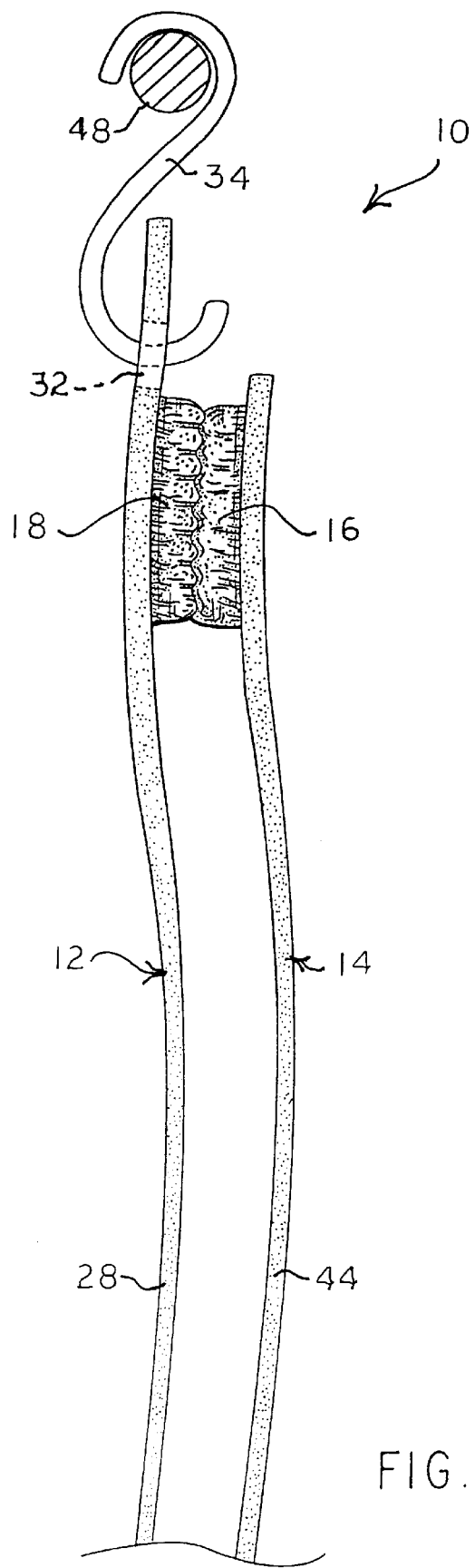
FIG. 3 is a left side view of the combined shower curtain sheet and the liner sheet (shown partially) hanging from a sectioned metal rod with plastic hooks according to the present invention.

The present invention illustrated in FIGS. 1, 2 and 3 is a combination 10 of a shower curtain sheet 12 and a liner sheet 14 joined by hook 16 and loop 18 fastening strips. The rectangular planar shower curtain sheet 12 has a front face 20, a rear face 22, a straight top edge 24, a straight right side edge 26, a straight left side edge 28, and a straight bottom edge 30. Apertures 32 are equidistantly spaced along the top edge 24 in a row for accepting shower curtain hooks 34 hanging from a conventional curtain rod 48.

A strip of loop attachment material 18 is attached adjacent to and below said apertures 32 on the rear face 22 of the shower curtain sheet 12 from the right side edge 26 to the left side edge 28. The rectangular planar liner sheet 14 has a front face 36, a rear face 38, a straight top edge 40, a straight right side edge 42, a straight left side edge 44, and a straight bottom edge 46 commensurate in width and slightly shorter in height from the top edge 40 to the bottom edge 46 than the shower curtain sheet 12. A strip of hook fastener material 16 is attached to the rear face 38 of the liner sheet 14 (by either an adhesive or by sewing) and contiguous with the top edge 40 from the right side edge 42 to the left side edge 44. The strip of loop fastener material 18 of the shower curtain sheet 12 and the hook fastener material strip 16 of the liner sheet 14 are aligned and joined at a top edge region, but can be separated readily for cleaning of either the shower curtain sheet or the liner sheet and reattached together for further use on the shower curtain rod 48 with the hooks 34.

The hook and loop material strips can be placed oppositely, with the hook material on the rear face of the curtain, and the loop material strip on the liner, and still be within the ambit of the present invention.

The shower curtain sheet 12 can be made from any durable natural or synthetic fabric material or any type of fabric material or color with various embroidered or colored patterns, and can be either waterproofed or not. The liner sheet 14 is made of a waterproof material such as a flexible plastic. The curtain hooks 34 are made of plastic and conveniently color matched to the shower curtain and liner combination 10.

Thus, it can be appreciated that the combination shower curtain and liner 10 can be useful and practical when cleaning of the liner requires removal from the shower hooks which necessitates the reaching up by someone unable to access the hooks and sometimes tearing the holes in the plastic liner from the hooks in the process. This problem is now eliminated by attaching the liner without apertures to the apertured shower curtain by hook and loop material. The removal consists of the liner from the shower curtain without excessive strain on the shower curtain holes held by the hooks.

It is to be understood that the present invention is not limited to the embodiments described above, but encompasses any and all embodiments within the scope of the following claims.

I claim:
1. A hook and loop combined shower curtain and liner construction comprising:
   a rectangular planar shower curtain sheet having a front face, a rear face, a straight top edge, a straight right side edge, a straight left side edge, and a straight bottom edge;
   apertures equidistantly spaced along said top edge in a row;
   plastic shower curtain hooks for hanging from a rod, each of said hooks passing through one of said apertures;
   a strip of one of hook and loop attachment material attached adjacent to and below said apertures on the rear face of the shower curtain from the right side edge to the left side edge;
   a rectangular planar liner sheet having a front face, a rear face, a straight top edge, a straight right side edge, a straight left side edge, and a straight bottom edge commensurate in width and slightly shorter in height from the top edge to the bottom edge than the shower curtain sheet;
   said shower curtain hooks being color matched to the shower curtain sheet and the liner sheet; and
   a strip of the other of hook and loop fastener material attached to the rear face of the liner sheet contiguous with the top edge from the right side edge to the left side edge;
   so that when the strips of loop fastener material of the shower curtain sheet and the hook fastener material of the liner sheet are joined, the shower curtain sheet and the liner sheet are joined at a top edge region and separated readily for cleaning of either the shower curtain sheet or the liner sheet and reattached together for further use.

2. The construction according to claim 1, wherein the shower curtain is made of a cloth fabric.

3. The construction according to claim 2, wherein the cloth fabric is waterproofed.

4. The construction according to claim 1, wherein the liner sheet is a flexible plastic.

5. The construction according to claim 1, wherein the loop material strip is attached to the shower curtain's rear face, and the hook strip material is attached to the liner sheet.

* * * * *